United States Patent [19]
Howes

[11] Patent Number: 6,101,783
[45] Date of Patent: *Aug. 15, 2000

[54] IMPACT RESISTANT WINDOW

[76] Inventor: Stephen E. Howes, 741 SE. Sixth Ter., Pompano Beach, Fla. 33060

[*] Notice: This patent is subject to a terminal disclaimer.

[21] Appl. No.: 09/167,697

[22] Filed: Oct. 7, 1998

Related U.S. Application Data

[63] Continuation of application No. 08/535,537, Sep. 28, 1995, abandoned.

[51] Int. Cl.$^7$ .................................................. E06B 5/00
[52] U.S. Cl. .................. 52/786.11; 52/204.7; 52/800.14; 52/204.69
[58] Field of Search ............................. 52/204.5, 204.53, 52/204.591, 204.593, 204.597, 204.6, 204.62, 204.69, 204.7, 786.1, 786.11, 786.12, 800.14, 171.1, 202, 762, 764, 770, 773, 778; 428/430

[56] References Cited

U.S. PATENT DOCUMENTS

| | | |
|---|---|---|
| 309,636 | 12/1884 | Mann . |
| 1,153,350 | 9/1915 | Smith . |
| 2,121,777 | 6/1938 | Bailey et al. ............................ 52/309.3 |
| 2,177,001 | 10/1939 | Owen . |
| 2,193,207 | 3/1940 | Rosen ................................. 52/204.59 X |
| 2,300,506 | 11/1942 | Kamerer . |
| 2,351,991 | 6/1944 | McClain .................................... 52/208 |
| 2,356,878 | 8/1944 | Painter ................................... 52/764 X |
| 2,369,382 | 2/1945 | Watkins . |
| 2,374,057 | 4/1945 | Watkins . |
| 2,401,552 | 6/1946 | Cox . |
| 2,406,939 | 9/1946 | Boicey .................................. 52/204.62 |
| 2,408,483 | 10/1946 | Rodman ................................ 52/786.12 |
| 2,409,808 | 10/1946 | Sowle .............................. 52/204.597 X |
| 2,497,957 | 2/1950 | Pelley ............................. 52/204.591 X |
| 2,567,353 | 9/1951 | Ryan . |
| 2,572,947 | 10/1951 | Pevney .................................... 52/764 X |
| 2,679,467 | 5/1954 | Sherts . |
| 2,755,518 | 7/1956 | Stroud . |
| 2,808,355 | 10/1957 | Christie et al. ................. 52/204.591 X |
| 2,837,454 | 6/1958 | Watkins et al. . |
| 2,945,269 | 7/1960 | Domen ........................... 52/204.591 X |
| 3,248,273 | 4/1966 | Boicey .............................. 52/786.12 X |
| 3,343,317 | 9/1967 | Cripe ................................. 52/786.12 X |
| 3,375,626 | 4/1968 | Grotefeld et al. ............. 52/204.597 X |
| 3,825,917 | 7/1974 | Lucky ............................... 52/786.11 X |
| 3,825,918 | 7/1974 | Laidlaw, Jr. et al. ............ 52/786.11 X |

(List continued on next page.)

FOREIGN PATENT DOCUMENTS

| | | |
|---|---|---|
| 15728 | 9/1928 | Australia . |
| 325098 | 7/1989 | European Pat. Off. . |
| 2495130 | 12/1980 | France . |
| 3203264 | 2/1982 | Germany . |
| 3708966 | 3/1987 | Germany . |
| 1562792 | 3/1980 | United Kingdom . |
| 2155856 | 10/1985 | United Kingdom . |
| 2121858 | 1/1989 | United Kingdom . |

OTHER PUBLICATIONS

Sax, N. Irving and Lewis, Sr., Richard J., "*Hawley's Condensed Chemical Dictionary*, Eleventh Edition", Van Nostrand Reinhold Co., pp. 19, 934, 936, 945 and 1039–1040 (1987)

Primary Examiner—Laura A. Callo
Attorney, Agent, or Firm—Wood, Herron & Evans, L.L.P.

[57] ABSTRACT

An impact resistant window including a frame holding a a glass composite structure including first and second glass sheets secured to each other with a middle plastic layer. The first, outer glass sheet has a larger perimetrical dimension than the second, inner glass sheet and the second glass sheet is centered on the first sheet to define a peripheral mounting portion of the first glass sheet. A resilient sealant material, such as silicone caulking, fills a space between the peripheral mounting portion of the first glass sheet and the frame structure.

19 Claims, 1 Drawing Sheet

U.S. PATENT DOCUMENTS

| | | |
|---|---|---|
| 3,825,919 | 7/1974 | Levin et al. ................... 52/786.11 X |
| 3,825,920 | 7/1974 | Nelson et al. ................. 52/786.11 X |
| 3,930,452 | 1/1976 | Van Laethem et al. ........... 428/339 X |
| 4,004,388 | 1/1977 | Stefanik . |
| 4,073,986 | 2/1978 | Keslar et al. ................... 428/430 X |
| 4,151,696 | 5/1979 | Knights et al. ................. 52/745.15 |
| 4,204,374 | 5/1980 | Olson .......................... 52/204.591 X |
| 4,228,425 | 10/1980 | Cooke .......................... 52/786.11 X |
| 4,324,373 | 4/1982 | Zibritosky ..................... 52/204.591 X |
| 4,546,986 | 10/1985 | Roselli ......................... 52/204.591 X |
| 4,551,372 | 11/1985 | Kunert .......................... 52/786.12 X |
| 4,625,070 | 11/1986 | Berman et al. ................. 136/249 |
| 4,724,023 | 2/1988 | Marriott . |
| 4,774,143 | 9/1988 | Gondela et al. ................ 428/442 |
| 4,817,347 | 4/1989 | Hand et al. .................... 52/786.12 X |
| 4,873,803 | 10/1989 | Rundo .......................... 52/202 |
| 4,908,083 | 3/1990 | Hall ............................. 156/99 |
| 4,952,258 | 8/1990 | Grolig et al. . |
| 4,978,405 | 12/1990 | Hickman . |
| 5,002,820 | 3/1991 | Bolton et al. .................. 428/215 |
| 5,019,443 | 5/1991 | Hall ............................. 428/215 |
| 5,268,049 | 12/1993 | Marriott et al. . |
| 5,315,952 | 5/1994 | Jackson, Jr. ................... 114/312 |
| 5,426,897 | 6/1995 | Gazaway . |
| 5,462,805 | 10/1995 | Sakamoto et al. ............... 428/430 |
| 5,553,422 | 9/1996 | Gazaway ........................ 52/204.53 |
| 5,636,484 | 6/1997 | DeBlock ........................ 52/204.5 |
| 5,765,325 | 6/1998 | DeBlock ........................ 52/204.5 |
| 5,778,629 | 7/1998 | Howes .......................... 52/786.11 |

IMPACT RESISTANT WINDOW

This application is a continuation of application Ser. No. 08/535,537 filed Sep. 28, 1995, now abandoned.

BACKGROUND OF THE INVENTION

The present invention generally relates to windows and, more specifically, to an impact resistant window structure especially suited for use in houses or buildings located in geographic regions susceptible to strong weather conditions such as tropical storms and hurricanes.

Impact resistant windows are desirable in many locations and situations. One application is in buildings or houses located in geographic regions which are highly susceptible to strong adverse weather conditions such as hurricanes involving extremely high winds. In such conditions, high winds can hurl large projectiles or debris into windows and the high winds themselves can create large pressure differentials between the inside and outside of a building. These pressure differentials can easily blow out or otherwise damage the windows of the house or building.

Several local building codes in hurricane zones now require new windows to conform to strict standards related to the ability of the window to withstand large impacts and large pressure differentials. One standard requires windows to withstand two strikes by an 8 foot long "two by four" piece of wood traveling at 34 mph. Then, after these two strikes, the window is subjected to 9000 positive and negative pressure cycles that simulate the eye of a hurricane passing the building. It appears that adoption of such strict standards will be universal in regions such as the southeastern portion of the United States.

One product which has successfully passed hurricane tests such as the one described above is marketed under the name "SENTRYGLAS". SENTRYGLAS is a laminated glass product which may be contained in a conventional window frame structure and includes an outer glass sheet, an outer polyester film layer and a polyvinyl butyryl layer sandwiched therebetween to adhere the polyester layer to the glass sheet. Silicone is used to secure this laminated glass product within the frame structure in a conventional manner. Although this product has passed hurricane tests, it has disadvantages associated with its relatively high cost combined with the fact that the polyester film layer scratches very easily and may not be replaced without replacing the entire glass laminate product.

One attempted solution to this problem involved laminating an additional glass layer on the opposite side of the polyester film layer to make the composite more similar to conventional laminated glass. This additional glass layer was of the same length and width dimensions as the first glass layer. However, when this modified SENTRYGLAS composite is subjected to the hurricane tests such as those mentioned above, the additional glass layer breaks and cuts or slices through the silicone sealant used to hold the composite in the frame. The glass then vacates the window and frame structure and the window therefore fails the test.

In view of the problems associated with available impact resistant window structures, there is a need for an impact resistant window which can not only pass the strict hurricane test standards now being imposed but which is also more aesthetically pleasing and economical than past impact resistant windows.

SUMMARY OF THE INVENTION

In accordance with the preferred embodiment of the present invention, a window structure is provided utilizing a glass laminate structure which closely resembles an all glass window and is scratch resistant as well as highly impact resistant. Generally, the window of the present invention includes two outer laminates which sandwich one or more laminates therebetween. Each of the laminates is at least translucent and preferably transparent. In accordance with the present invention, one of the outer laminates is reduced in its perimetrical dimension with respect to the other of the outer laminates. In the case of a simple four sided window pane shown as the preferred embodiment, the length and width dimensions of one outer laminate are smaller than the length and width dimensions of the other of the outer laminates.

The larger sized laminate sits a greater distance within the frame of the window while the smaller of the two outer laminates preferably only fits partially within the inside edge of the frame. Preferably, the entire perimeter of the laminated window pane is bounded by a portion which remains unlaminated by the second, outer laminate. This peripheral unlaminated portion of the window pane is set within a conventional window frame structure and the space formed between the first, larger laminate and the inside of the window frame is filled with a sealant or caulking such as silicone.

In the preferred embodiment, the two outside laminates are glass sheets while the third, inner laminate is a strengthening plastic layer, such as a polyester film. The polyester film may be adhered to both glass sheets by a compatible adhesive, such as a polyester resin.

With the composite glass laminate structure of the present invention, a glass composite product is formed having both inner and outer glass layers which therefore give the window a very realistic glass appearance. Also, as both the inside and outside surfaces of the window are glass surfaces, they are not easily scratched or otherwise marred during normal use. Finally, in accordance with a main advantage of this invention, the glass composite laminate structure of the invention passes the hurricane standard tests explained above. That is, as the smaller outside glass sheet does not extend fully into the frame structure along with the larger glass sheet, this smaller glass laminate layer does not break away from the larger layer and break through the frame as is the case with prior attempts in this area.

Additional advantages and objects of the present invention will become readily apparent to those of ordinary skill upon review of the following detailed description of the preferred embodiment taken in conjunction with the accompanying drawings.

DETAILED DESCRIPTION OF THE PREFERRED EMBODIMENT

Figures 1, 2, 3:
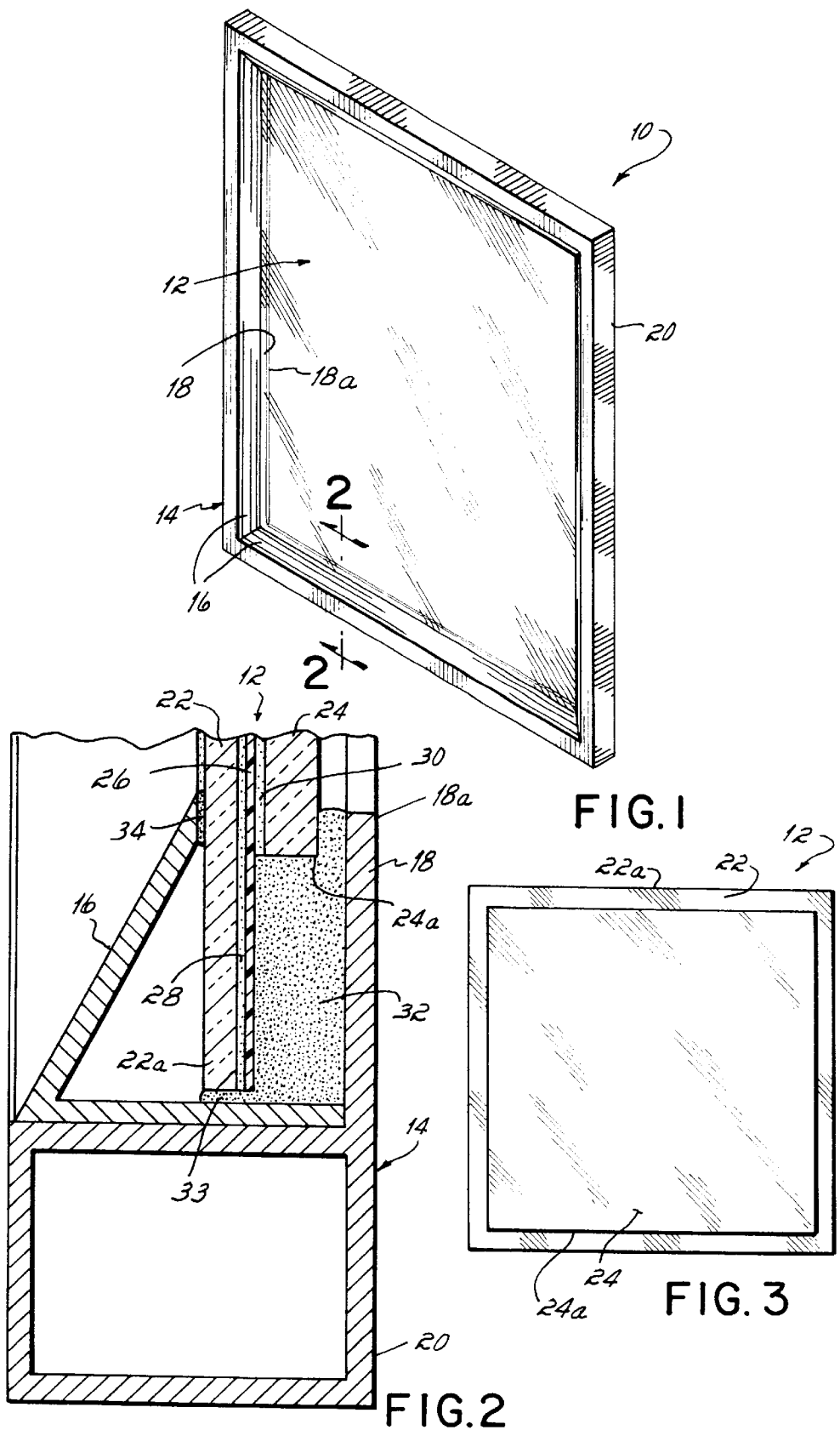
FIG. 1 is a perspective view of a window constructed in accordance with the preferred embodiment of this invention.
FIG. 2 is a cross-sectional view of the window frame structure and glass laminate structure in the area surrounding the frame and taken along line 2—2 of FIG. 1.
FIG. 3 is a plan view of the glass laminate structure of the invention without the frame.

FIG. 1 illustrates a simple form of window 10 constructed in a accordance with the present invention. In its most basic form, window 10 comprises a glass laminate structure or composite 12 fixed within a peripheral frame structure 14. Of course, window 10 may take on many other forms and shapes depending on the needs of the application or the aesthetics desired, however, the principles of the present invention will remain essentially the same.

FIG. 2 illustrates a cross-sectional view of the frame 14 and the peripheral portion of glass composite 12 which has been secured into frame 14. Specifically, glass composite 12 has been fixed between an outside support 16 and an inside support 18 of frame 14. Supports 16, 18 extend inwardly from an outer peripheral frame portion 20 which may be fixed into a building structure in a conventional manner. Frame 14 may be a conventional frame and has been schematically shown as such in the drawings.

Glass laminate structure or composite 12 more specifically includes a first glass layer or laminate 22 and a second glass layer or laminate 24 sandwiching a plastic strengthening layer or third laminate 26 therebetween. Glass layer 22 is the outside glass layer and is of a larger overall length and width dimension than inside glass layer 24 as shown in FIG. 3. As also shown in FIG. 3, glass layer 24 is substantially centered on glass layer 22 to provide mounting portion 22a around the entire perimeter of laminate structure 12. Glass layer 22 is preferably about 1–2" larger in both length and width than inside glass layer 24. Therefore, if glass layer 22 is 24"×24", glass layer 24 may be 22"×22" in size. The entire peripheral region 22a of glass layer 22 therefore preferably remains "unlaminated" by glass layer 24.

Plastic layer 26 is preferably a polyester film or "PET" layer which is adhesively secured to opposed surfaces of glass layers 22, 24 by respective adhesive layers 28, 30. Adhesive layers 28, 30 are preferably formed of a polyester resin which is compatible with both glass and PET. Alternatively, polyvinyl butyryl may be used as the adhesive for layers 28 and 30. As shown in FIG. 2, plastic layer 26 and adhesive layer 28 preferably extend to the peripheral edge of glass layer 22. Caulking or sealant 32 such as conventional silicone caulking fills the space between peripheral portion 22a of glass layer 22 and frame support member 18 to chemically bond with plastic film layer 26. The peripheral edge of glass layer 22 also preferably seats against silicone sealant or caulking 33 as shown in FIG. 2. Sealant or caulking 34 is also applied between frame support 16 and outside glass layer 22.

As will also be appreciated from FIG. 2, inside glass layer 24 is not reduced in size so much as to expose its peripheral edge 24a outside of edge 18a of support 18. In other words, inside glass layer 24 is sized large enough to extend just into frame 14 to be hidden from view when window 10 is fully constructed as shown in FIG. 1. Therefore, window 10 looks exactly like a conventional window as the unique structure of the present invention is hidden from view within frame 14.

During the hurricane tests explained above, in which an 8 foot long two by four is used to strike window 10 twice at 34 mph and then in which window 10 is subjected to a positive and negative pressure cycles (simulating hurricane conditions), glass composite or laminate structure 12 does not break out of frame 14. This is believed to be due to the design of the peripheral portions of glass laminate structure or composite 12. Specifically, peripheral glass layer portion 22a moves against silicone caulking 32 but does not move against another glass laminate layer within this space which could break off and slice through caulking 32 and vacate frame 14. In addition, the present invention fulfills the objectives of constructing a window which is pleasing in appearance as the areas which are seen between the four portions of frame 14 are all glass on both the inside and outside of the house or building. Finally, the glass composite or laminate product 12 is also scratch resistant because of the use of inside and outside glass layers.

Many modifications may be made to the specific details provided herein with respect to window 10 including, but not limited to many alternative shapes for window 10 and alternative designs for frame 14. Various inner plastic strengthening layers may be used in the laminate product or composite of the present invention. These plastic layers may or may not extend to the periphery of glass layer 22. Applicant does not intend to be bound by the specific details provided herein but intends only to be bound by the scope of the appended claims.

What is claimed is:

1. An impact resistant window comprising:
   a frame;
   a composite sheet structure including a first glass sheet, a second glass sheet and a flexible plastic film layer bonded together, said plastic film layer being bonded by first and second adhesive layers between said first and second glass sheets, said plastic film layer having a peripheral edge portion extending outwardly from all sides of one of said first and second glass sheets and wherein the peripheral edge portion of said plastic film layer is secured within said frame by a resilient sealant material forming a chemical bond with the plastic film layer.

2. The impact resistant window of claim 1 wherein said frame further comprises a peripheral frame portion and two inwardly extending support members, said composite sheet structure being secured between said support members.

3. The impact resistant window of claim 2 wherein both said first and second glass sheets extend within a space formed between said support members but said first glass sheet extends farther into said space than said second translucent laminate.

4. The impact resistant window of claim 3 wherein said space further contains the resilient sealant material.

5. The impact resistant window of claim 4 wherein said resilient sealant material is silicone caulking.

6. The impact resistant window of claim 1 wherein said flexible plastic film layer is a polyester film layer.

7. The impact resistant window of claim 1 wherein said second glass sheet is substantially centered on said first glass sheet and thereby creates a periphery of said first glass sheet which is unlaminated by said second glass sheet.

8. An impact resistant window comprising:
   a frame including a peripheral frame portion and window pane support members extending therefrom;
   a glass composite structure including first and second glass sheets secured to each other with a flexible plastic film layer bonded therebetween by respective adhesive layers, said plastic film layer having a peripheral edge portion extending outwardly from all sides of one of said first and second glass sheets, said first and second glass sheets and said plastic film layer being secured between said support members; and
   a resilient sealant material filling a space between the peripheral edge portion of said plastic film layer and one of said support members and forming a chemical bond with the plastic film layer.

9. The impact resistant window of claim 8 wherein both said first and second glass sheets extend between said support members but said first glass sheet extends farther outwardly between said support members than said second glass sheet.

10. The impact resistant window of claim 8 wherein said resilient sealant material is silicone caulking.

11. The impact resistant window of claim 8, wherein said plastic film layer is a polyester film layer.

12. The impact resistant window of claim 8 wherein said second glass sheet is substantially centered on said first glass sheet.

13. The impact resistant window of claim 8 wherein said first and second glass sheets are four sided and said first glass sheet is defined by larger length and width dimensions than said second glass sheet.

14. An impact resistant window pane comprising a composite sheet structure including a first translucent laminate, a second translucent laminate and a flexible plastic film layer bonded between said first and second translucent laminates, respectively, by first and second adhesive layers, said flexible plastic film layer having a peripheral edge portion extending outwardly from all sides of one of said first and second translucent laminates, wherein said second translucent laminate is substantially centered on said first translucent laminate and thereby creates a peripheral area of said first translucent laminate which is unlaminated by said second translucent laminate.

15. The impact resistant window pane of claim 14 wherein said first and second translucent laminates further comprise first and second glass sheets.

16. The impact resistant window pane of claim 15 wherein said second glass sheet is substantially centered on said first glass sheet for creating a peripheral mounting portion on said first glass sheet.

17. The impact resistant window pane of claim 16 wherein said plastic film layer is a polyester film layer secured between said first and second glass sheets with a polyester resin.

18. The impact resistant window pane of claim 16 wherein said plastic film layer is a polyester film layer secured between said first and second glass sheets with polyvinyl butyryl.

19. The impact resistant window pane of claim 14 wherein said first and second translucent laminates are four sided laminates, said first translucent laminate having larger length and width dimensions than said second translucent laminate.

\* \* \* \* \*